Patented July 27, 1954

2,684,976

UNITED STATES PATENT OFFICE 2,684,976

N-M-CHLOROPHENYLFORMIMIDIC ACID ESTERS AND PROCESS OF PREPARATION

Samuel A. Glickman, Easton, Pa., assignor to General Aniline & Film Corporation, New York, N. Y., a corporation of Delaware No Drawing. Application December 31, 1951, Serial No. 264,351

7 Claims. (Cl. 260—453)

This invention relates to N-m-chlorophenylformimidic acid esters and the process of preparing the same.

Alkyl N-arylformimidates are well known and have been synthesized by several methods. Claisen (Annalen 287, 363 [1895]) prepared ethyl N-phenylformimidate in 44% yield by the reaction of aniline and orthoformate but only after numerous unsuccessful attempts. Although Claisen indicated that his directions must be closely followed, other investigators were unable to repeat his results.

Hamer, Rathbone, and Winton (J. Chem. Soc. 1947, 954–959) reported modifying Claisen's procedure and obtained yields of 81–85% by including aniline hydrochloride to inhibit the formation of carbylamine. These investigators boiled together aniline, ethyl orthoformate in 100% molar excess and 8 mol per cent of aniline hydrochloride collecting the alcohol eliminated. After cooling any diphenylformamidine was filtered and the filtrate distilled to give an 81–85% yield based on aniline. This report fails to indicate the yield based on orthoformate which is an important consideration in manufacturing operations. The large amount of aniline hydrochloride used, in the order of 8 mol per cent, would facilitate the decomposition of orthoformate which is the leading side reaction and accounts for the large excess of orthoformate used by these investigators. Furthermore, a non-homogeneous mixture is indicated since diphenylformamidine hydrochloride is insoluble in the reactants. This probably accounts for the need of cooling the mixture and filtration of solid which no doubt contains the insoluble hydrochloride.

Roberts (JACS 71, 3848 [1949]) recognized the role of acid catalysis in the reaction of arylformamidines with orthoformates. He reports good yields of N-arylformamidates by the reaction of arylformamidines and arylamines with orthoformate in the presence of hydrochloric, sulfuric, and p-toluenesulfonic acids. Distillation of the alcohol was followed by treatment with an alkalizing agent, such as potassium carbonate, sodium t-butoxide, and calcium carbonate. The formimidates were distilled at reduced pressure in excellent yields. The article refers specifically to ethyl N-phenylformamidate and ethyl N-p-tolyl formimidate.

Knott and Jeffreys (J. Org. Chem. 14, 879–85 [1949]) report the preparation of ethyl N-o- and N-p-chlorophenylformimidates from ethyl orthoformate and o- and p-chloroaniline. The procedure employed was that of Claisen (above mentioned) and the authors did not cite yields other than mentioned that in the preparation of ethyl N-p-chlorophenylformamidate, a large quantity of di-(p-chlorophenyl)-formamidine was also obtained. This is not surprising since no acid catalysts were employed and the formamidine may be expected to be the major product.

Lower alkyl N-m-chlorophenylformimidates are highly desired as starting materials for the preparation of anti-malarial drugs. In particular, ethyl N-m-chlorophenylformimidate is a highly desired starting material for the manufacture of arylaminomethylenemalonates. The improved process of preparing the latter is disclosed in my application Serial No. 264,352, now Patent No. 2,638,480, filed on even date. The arylaminomethylenemalonates are further reacted and converted to 4,7-dichloroquinoline which is the base for a number of commercially valuable anti-malarial drugs, such as, for example:

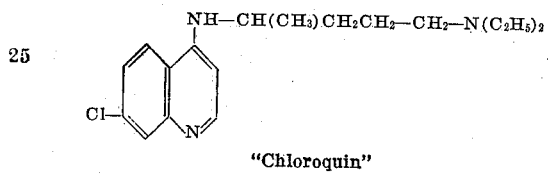

"Chloroquin"

and

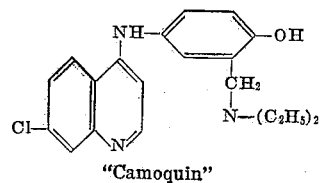

"Camoquin"

The various processes presently utilized in the manufacture of 4,7-dichloroquinoline are involved and complicated.

The further reaction and conversion of arylaminomethylenemalonates into 4,7-dichloroquinoline, the base, and into the class of 4-amino-7-chloroquinolines which possess anti-malarial action is disclosed in the following references: Price and Roberts, Journ. Amer. Chem. Soc., 68, page 1204, (1946); Surrey and Hammer, Journ. Amer. Chem. Soc., 68, page 115, (1936); Andersag et al., USP 2,233,970; Modern Chemical Processes, pages 110–118; Industrial Eng. Chem., page 654, (1949).

It is the object of the present invention to provide N-m-chlorophenylformimidic acid esters which lend themselves quite readily without involved and complicated procedures in the preparation of 4,7-dichloroquinoline.

Another object is the process of preparing the same.

Other objects and advantages will become apparent from the following description.

I have discovered that lower alkyl esters of N-m-chlorophenylformimidic acid characterized by the following formula:

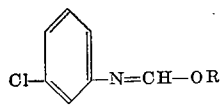

wherein R represents a lower alkyl, i. e, methyl, ethyl, propyl, isopropyl, butyl, isobutyl, etc., are readily prepared by heating to reflux a mixture of m-chloroaniline and a lower alkyl orthoformate in small excess in the presence of 0.4 mol per cent of p-toluenesulfonic acid followed by the distillation of the alcohol formed. The recovery of the excess orthoformate and the distillation of N-m-chlorophenylformimidate is conducted at reduced pressure. The yield of formimidate is 84–89% based on both m-chloroaniline and lower alkyl orthoformate employed.

In preparing the esters characterized by the above formula, I employ a procedure which differs from procedures disclosed and suggested in the foregoing references in the following respects:

(1) The use of p-toluenesulfonic acid in 0.4 mol per cent concentration replaces the quantities in the order of 10 and 20 times that amount of an acid catalyst;

(2) The employment of the p-toluenesulfonic acid in place of the hydrochloride or sulfate ensures a homogeneous medium with no difficulties of poor heating exchange, bumping, etc.;

(3) The excess of orthoformate is reduced from a 100% excess to 40% and can be further reduced if desired;

(4) Excellent recoveries of orthoformate are obtained and the yield based on the amount of orthoformate utilized differs less than 5% from yields based on m-chloroaniline, and (5) In the reaction of the lower alkyl orthoformate and m-chloroaniline in the presence of a catalytic amount ranging from 0.02 to 0.5 mol per cent of an organic sulfonic acid, such as, for example, p-toluenesulfonic acid, alkalization according to Roberts' procedure is not necessary and an 89% yield is obtained. This represents a simpler procedure than Roberts and avoids the formation of insoluble salts which cause difficulties in distillation, such as bumping, poor heat transfer, and decomposition.

In preparing the esters of the present invention, a mixture consisting of a molecular equivalent of m-chloroaniline and a molecular equivalent of a lower alkyl orthoformate, such as methyl, ethyl, propyl, isopropyl, butyl, or isobutyl, orthoformate in a small excess ranging from about 0.25 to 1.0 mol, and 0.4 mol per cent of p-toluenesulfonic acid is heated to reflux and the reflux temperature maintained for a period of time ranging from 1 to 1½ hours. A distilling condenser is attached to the reflux condenser and in the course of 2 to 5 hours the lower alcohol formed as a by-product is distilled, the reaction mixture gradually reaching a temperature ranging from 135–160° C. Heating under the latter temperature ranges is continued for an additional 2–4 hour period and the residual contents of the reaction vessel subjected to distillation at reduced pressure ranging from 20 mm. to 50 mm. to recover the unreacted lower alkyl orthoformate. The pressure is then further reduced to 4.0 to 5.0 mm. so as to distill the final product.

As an alternate procedure, the reaction mixture after distilling off the lower alcohol is heated for about 1 hour at 135–160° C. and treated with a very small quantity of sodium methylate and subjected to distillation at reduced pressure as above.

The following examples illustrate in more detail how the esters of the present invention are prepared. It is to be understood that these examples are merely illustrative and are not to be limitative.

*Example I*

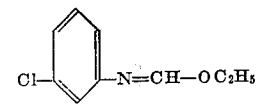

Ethyl N-m-chlorophenylformimidate

A mixture of 518 grams of ethyl orthoformate, 320 grams of m-chloroaniline, and 2 grams of p-toluenesulfonic acid was heated to the reflux point and maintained at reflux (85° C.) for 1 hour. In the course of the next 3 to 4 hours, 230 grams of ethanol were distilled, the flask temperature gradually reaching 150° C. Heating was continued for an additional 3 hours. The contents were then subjected to distillation at reduced pressure, i. e., 25 mm. There were recovered 121 grams of ethyl orthoformate having a boiling point of 59° C. at 25 mm. The pressure was reduced to 4.5 mm. and there were distilled 410.5 grams of ethyl N-m-chlorophenylformimidate having a boiling point of 99–100° C. at 4.5 mm.; $n_D^{25}$ 1.539–1.540; $d_4^{25}$ 1.134. This represents an 89% yield based on m-chloroaniline and an 84% yield based on ethyl orthoformate utilized.

*Example II*

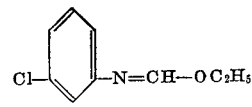

Example I was repeated with the exception that the reaction mixture was treated with 0.012 mol of sodium methylate prior to the distillation of the product. The yield obtained was 89% based on both m-chloroaniline and ethyl orthoformate utilized.

*Example III*

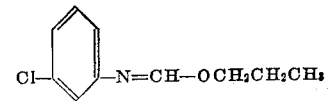

Propyl N-m-chlorophenylformimidate

Example I was again repeated with the exception that 518 grams of ethyl orthoformate were replaced by 665 grams of propyl orthoformate. The yield obtained was 80% based on both m-chloroaniline and propyl orthoformate utilized.

*Example IV*

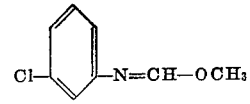

Methyl N-m-chlorophenylformimidate

A mixture of 185 grams of methyl orthoformate, 160 grams of m-chloroaniline, and 1 gram of p-toluenesulfonic acid was heated to reflux temperature and maintained at reflux (72° C.) for 1 hour. In the course of the next 3 to 4 hours, the methanol formed was distilled, the flask temperature reaching 140° C. Heating was continued for 1 hour at 140–145° C. The reaction mixture was treated with 0.006 mol of sodium methylate and subjected to distillation at reduced pressure. There were obtained 134.5 grams of methyl N-m-chlorophenylformimidate with a boiling point of 116° C. at 16–17 mm.; $n_D^{25}$ 1.552; $d_4^{25}$ 1.1794. This represents a 63% yield based on m-chloroaniline and a 60% yield based on methyl orthoformate utilized.

*Example V*

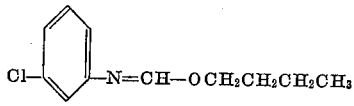

Butyl N-m-chlorophenyl formimidate

A mixture of 812 grams of N-butyl orthoformate, 320 grams of m-chloroaniline, and 2 grams of p-toluensulfonic acid was heated to 125–130° C. for 1 hour. The temperature was raised to 160° C. with the accompanying distillation of butanol. The temperature was maintained at 160° C. for 2 hours. The excess butyl orthoformate was recovered by distillation at 25 mm. The product was distilled at 2 mm. to give an 82% yield of butyl, N-m-chlorophenylformimidate.

*Example VI*

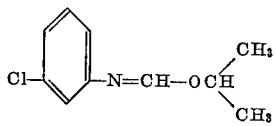

Isopropyl N-m-chlorophenylformimidate

Example II was repeated with the exception that 665 grams of isopropyl orthoformate replaced the initial charge of ethyl orthoformate. The yield of isopropyl N-m-chlorophenyl-formimidate formed was 85% based on both m-chloroaniline and isopropyl orthoformate.

While I have disclosed the preferred embodiments of my invention, it will be readily appreciated by those skilled in the art that many changes and variations may be made therein without departing from the spirit thereof. The scope of the invention is to be limited solely by the appended claims.

I claim:

1. The process of preparing lower alkyl N-m-chlorophenylformimidates which comprises reacting at reflux temperature, 1 mol of m-chloroaniline with 1 mol in excess of 0.25 to 1 mol of a lower alkyl orthoformate in the presence of 0.4 mol per cent of an organic sulfonic acid as a catalyst, removing a lower alkyl alcohol formed during the reaction and heating the residual reaction product at reduced pressure to distill off the lower alkyl N-m-chlorophenylformimidate.

2. The process of preparing lower alkyl N-m-chlorophenylformimidate which comprises heating, at reflux temperature, 1 mol of m-chloroaniline with 1 mol in excess of 0.25 to 1 mol of a lower alkyl orthoformate in the presence of 0.4 mol per cent of p-toluenesulfonic acid, removing a lower alkyl alcohol formed during the reaction, distilling off the excess lower alkyl orthoformate and distilling off the lower alkyl N-m-chlorophenylformimidate at reduced pressure.

3. The process of preparing ethyl N-m-chlorophenylformimidate which comprises heating to reflux a mixture of 1 mol of m-chloroaniline with 1 mol in excess of 0.25 to 1 mol of ethyl orthoformate in the presence of 0.4 mol per cent of p-toluenesulfonic acid as a catalyst, removing ethyl alcohol formed during the reaction, distilling off the excess ethyl orthoformate followed by distillation of the ethyl N-m-chlorophenylformimidate at reduced pressure.

4. The process according to claim 1 wherein the lower alkyl orthoformate is methyl orthoformate.

5. The process according to claim 1 wherein the lower alkyl orthoformate is ethyl orthoformate.

6. The process according to claim 1 wherein the lower alkyl orthoformate is propyl orthoformate.

7. The process according to claim 1 wherein the lower alkyl orthoformate is butyl orthoformate.

References Cited in the file of this patent

UNITED STATES PATENTS

| Number | Name | Date |
|---|---|---|
| 2,504,896 | Snyder et al. | Apr. 18, 1950 |

OTHER REFERENCES

Grunfeld, Bull. Soc. Chim. 654–664 (1937).
Wiseloglee "Survey of Anti-Malarial Drugs," vol. I (1941–45), pp. 159–160.
Knott et al., J. Org. Chem. 14, 879–85 (1949).
Roberts, J. A. C. S., 3848–9 (1949).